Oct. 21, 1969  A. J. PFEIFFER ET AL  3,473,345
MEAT KEEPER FOR REFRIGERATORS

Filed Dec. 26, 1967  3 Sheets-Sheet 1

INVENTORS
AELRED J. PFEIFFER
LOUIS R. MARZ
BY
Haven E. Simmons
ATTORNEY

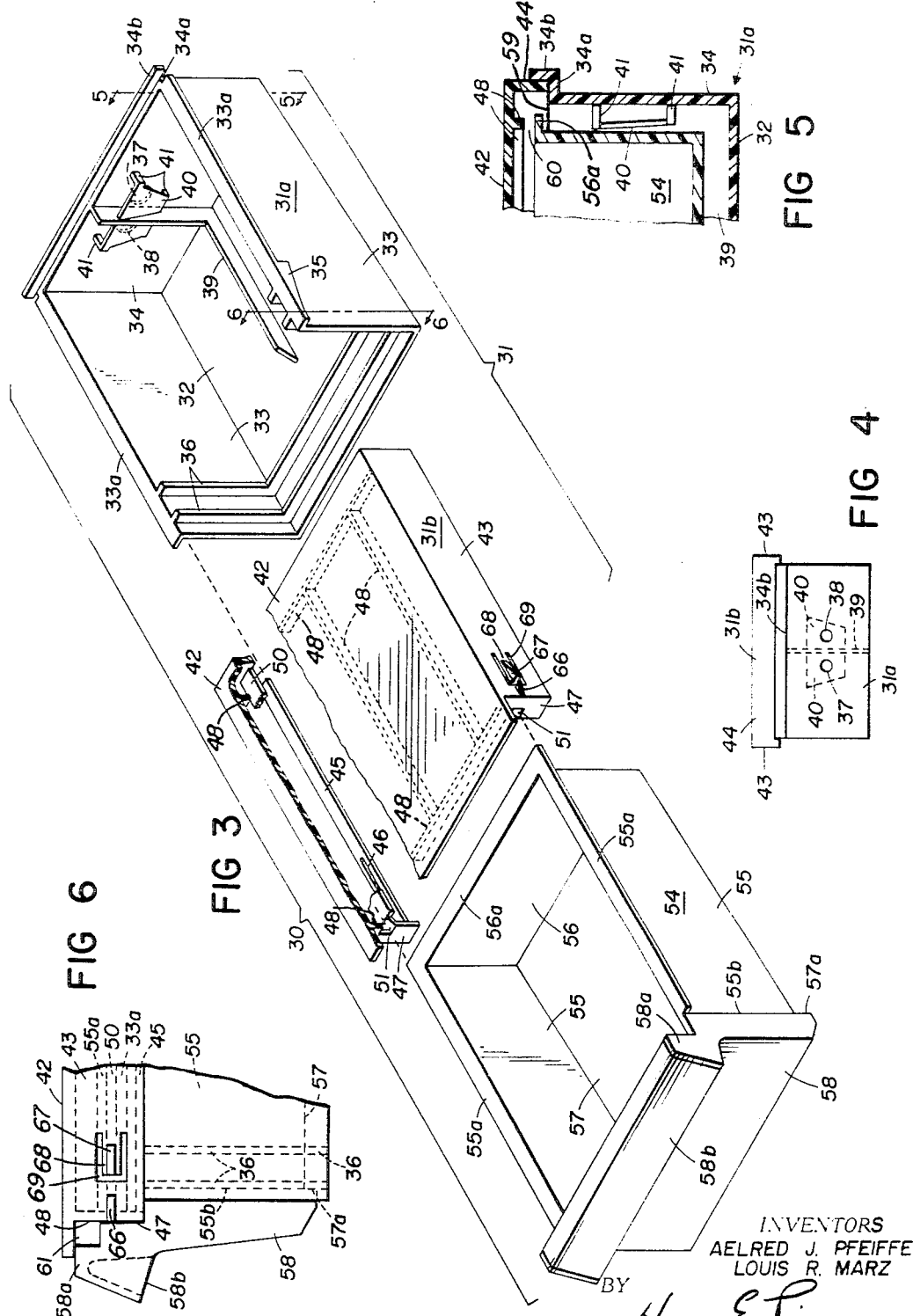

United States Patent Office 3,473,345
Patented Oct. 21, 1969

3,473,345
MEAT KEEPER FOR REFRIGERATORS
Aelred J. Pfeiffer, Cedar Rapids, and Louis R. Marz, Homestead, Iowa, assignors to Amana Refrigeration, Inc., a corporation of Delaware
Filed Dec. 26, 1967, Ser. No. 693,620
Int. Cl. F25d 17/06, 25/02
U.S. Cl. 62—408            6 Claims

ABSTRACT OF THE DISCLOSURE

A meat keeper for freezer-refrigerators in which the exterior of the meat container is bathed by sub-freezing air ducted between the meat container and an outer sleeve in which the container is slidably mounted. The chilled air enters and exits through ports in the rear wall of the sleeve and a manually operated valve controls the amount of air admitted to the inlet port. A small amount of air from the latter port is also admitted directly into the meat container proper.

BACKGROUND OF THE INVENTION

Fresh meat is best preserved for periods of several days when it is chilled to a temperature near the freezing point of water or somewhat therebelow. The temperature of the meat cannot be simply lowered, however, without certain difficulties ensuing. If the meat is exposed to a chilled environment, such as flowing cold air, it rather quickly becomes dehydrated; if, on the other hand, it is encased and then chilled, the meat tends to become slimy. The chief object of the present invention, therefore, is to devise a fresh meat keeper which will avoid both the foregoing difficulties so far as practicable and yet preserve the meat over an extended period of days.

SUMMARY OF THE INVENTION

The meat container itself is in the form of a drawer slidably fitted within an open front sleeve. The sleeve in turn is formed of two parts. The first is a box-like structure having bottom, side and rear walls spaced from the corresponding walls of the drawer. The second part constitutes a top lid which fits over the first and closes the top of the drawer. The assembly is located in the food compartment and supplied through an inlet port in the rear wall of the sleeve with air from a remotely disposed evaporator operating at sub-freezing temperature. A special duct connects the inlet port of the sleeve with the evaporator air passages and a manually operated valve is provided in the duct in order to control the amount of chilled air admitted to the sleeve. The air entering the latter is ducted from the inlet port forward along the drawer, across the front of its bottom and then rearward along the drawer to an exit port in the rear wall of the sleeve laterally spaced from the inlet port and emptying into the food compartment. The ducting of the air is accomplished by means of a rib extending down the back of the sleeve between the inlet and exit ports and part way forward along its bottom. Thus the entire bottom, side and rear walls of the drawer are bathed in chilled air. At the same time the fit of the drawer in the sleeve is such that narrow spaces are left between the upper edges of the front and rear walls of the drawer and the top lid of the sleeve so that a small supply of chilled air is admitted from the sleeve into and through the drawer itself. In this manner both dehydration and sliming are effectively controlled and fresh meat can be preserved by means of the present invention for periods up to two weeks.

BRIEF DESCRIPTION OF THE DRAWINGS

FIGURE 3 is an exploded assembly view of the meat keeper of the present invention.
FIGURE 4 is an end elevational view of the meat keeper of FIGURE 3 shown assembled.
FIGURE 5 is a detail view taken along the line 5—5 of FIGURE 3 but with the parts of the meat keeper shown in assembled relation.
FIGURE 6 is a detail view taken along the line 6—6 of FIGURE 3 but with the parts of the meat keeper shown in assembled relation.

DESCRIPTION OF THE PREFERRED EMBODIMENT

Figure 1:
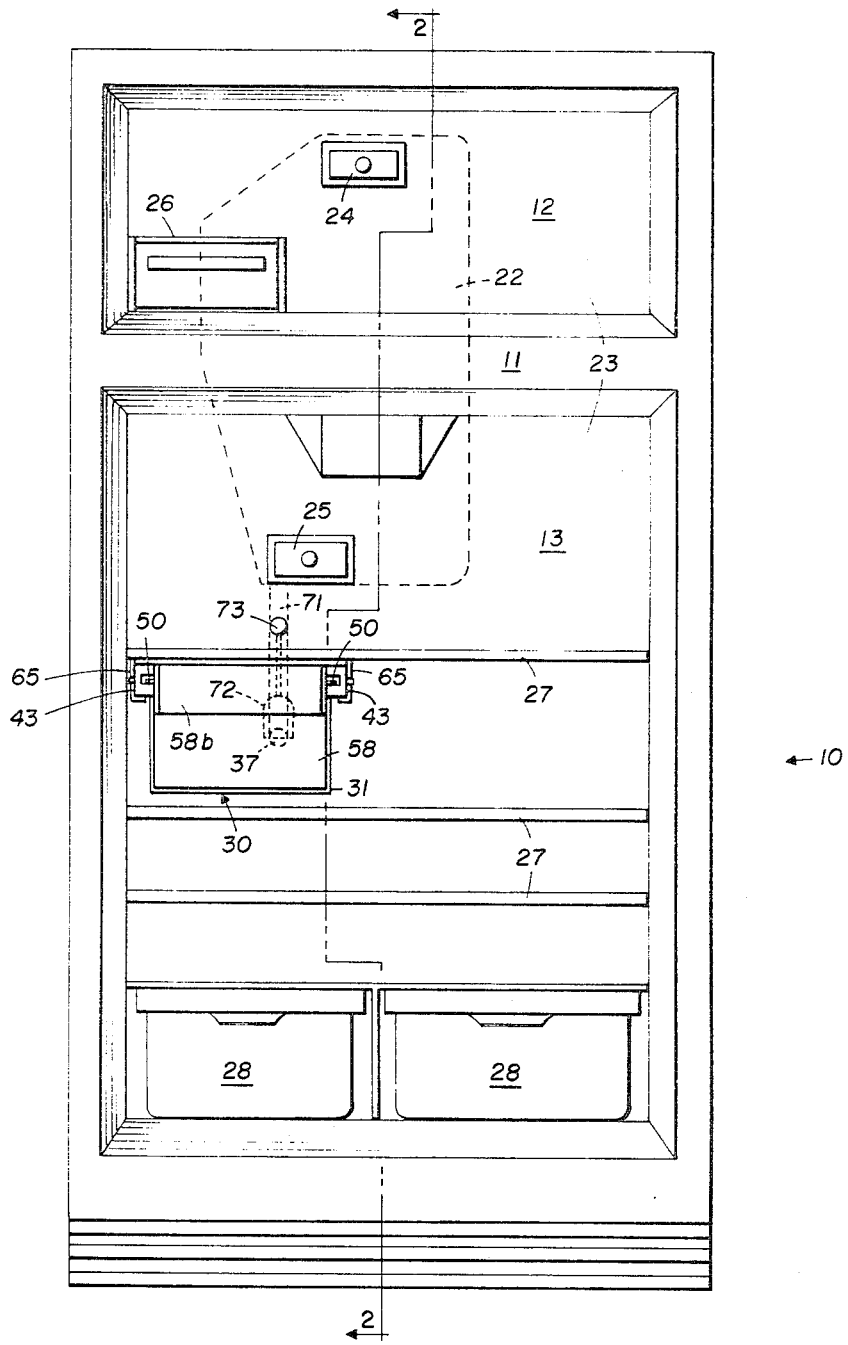
FIGURE 1 is a front elevational view of a typical freezer refrigerator shown with the doors removed.

The illustrated freezer-refrigerator, which is of the so-called "top mount" variety, comprises a typical cabinet 10 divided by a horizontal partition 11 into an upper freezer compartment 12 and a lower food compartment 13 closed by doors 14 and 15, respectively. The partition 11 includes a fore and aft passageway 16 in which is disposed an evaporator 17 supplied with refrigerant from the machinery compartment 18. Air from compartments 12 and 13 is drawn by a fan 19 through ports 20 and 21, respectively, into the passageway 16 and through evaporator 17. The latter air is then discharged by fan 19 into a plenum chamber 22 formed behind the rear wall of cabinet liner 23 from which it is expelled into the compartments 12 and 13 by means of outlets 24 and 25, respectively, on the rear wall of liner 23. A portion of the air from plenum chamber 22 is also ducted into the rear of a "freezing tunnel" 26 while the food compartment 13 is equipped with suitable shelving 27 and crisper pans 28. Further details of the freezer-refrigerator concerned may be found in the co-pending application of Richard D. Maxwell, Ser. No. 665,795, filed Sept. 6, 1967, but inasmuch as those details play no part in the present invention they are not further set forth herein.

The meat keeper unit itself, generally designated at 30 and best shown in FIGURES 3–6, consists of a two part sleeve 31, each of the two parts 31a and 31b being integrally molded from suitable plastic. The basic part 31a of sleeve 31 is in the form of an open front, open top rectangular box having a bottom wall 32 and a pair of side walls 33 and a rear wall 34 provided with flanged top edges 33a and 34a respectively, the latter additionally having an upstanding stop wall 34b. The forward ends of the flanges 33a are fitted with integrally formed, depending catches 35 (only one of which is shown) for purposes to be described. Adjacent the forward end of the box 31a are a pair of upstanding interior ribs 36 extending in parallel spaced relation downwardly from the top of side walls 33 and transversely across the bottom wall 33. The rear wall 34 is provided with a pair of centrally located, laterally spaced inlet and outlet ports 37 and 38, respectively, separated by an interior, upstanding rib 39 extending downwardly from the top of rear wall 34 and thence forwardly along the bottom wall 32, terminating short of the rearward of the two ribs 36. The ribs 36 and 39 are of equal height and integrally molded with the respective walls of box 31a. Also integrally molded with the rear wall 34 and the rib 39 are a pair of baffles 40 extending laterally from each side of rib 39 and spaced forward of the inlet and outlet ports 37 and 39. The baffles 40 are of somewhat inverted trapezoidal shape and their corners remote from rib 39 are tied to the rear wall 34 by means of integral horizontal legs 41. The ports 37 and 38 can thus communicate with the interior of box 31a by means of the passages thereby formed between the tops, bottoms and remote ends of baffles 40 on the one hand, and the rear wall 34 on the other. In addition, baffles 40 are somewhat inclined with respect to the rear wall 34 so that the spacing therebetween is greater at the tops of baffles 40 than at their bottoms (see FIGURE 5).

The remaining part 31b of the sleeve 31 is in the form of an integrally molded top lid having a top wall 42 and depending side and rear walls 43 and 44 about its side and rear edges, respectively. The side walls 43 include a pair of lower runners 45 (one only being shown) formed by inwardly turned horizontal flanges on the lower edges of side walls 43 and opening through the rear wall 44. The runners 45 slidably receive and support the flanges 33a of the box 31a, the rear wall 44 of the top lid 31b abutting the stop wall 34b of box 31a and the catches 35 of the latter engaging slots 46 (only one of which is shown) in the runners 45 adjacent their forward ends. The forward ends of runners 45 are closed by integral end walls 47 and the top wall 42 is stiffened by means of three longitudinal and two transverse integral ribs 48 on its under side, the forward transverse one of which lies in the plane of end walls 47. Between the lower runners 45 and the ribs 48 along each top side wall 43 are disposed a pair of integral drawer runners 50 which abut the rear top wall 44 and open through the end walls 47 at 51.

The sleeve 31 in turn slidably receives an integrally molded meat drawer 54 having side walls 55, a rear wall 56, a bottom wall 57 and a front wall 58. The upper edges of side walls 55 are provided with flanges 55a and the rear wall with a flange 56a. The flanges 55a slidably engage the drawer runners 50, and the side walls 55 and bottom wall 57 engage the tops of ribs 36 when drawer 54 is closed. At the same time the bottom wall 57 also slidably engages the horizontal portion of rib 39 and the vertical portion of the latter acts as a stop against the rear drawer wall 56. In order to improve sealing and to present a more finished appearance, the drawer side walls 55 and bottom wall 57 are outwardly shouldered at 55b and 57a, respectively, which shoulders engage the outer face of the forward one of ribs 36. Additionally and for the same purpose the front drawer wall 58 includes an upward shoulder 58a which includes an undercut drawer pull portion 58b. For the purpose of admitting a small portion of air into drawer 54, the flange 56a of its rear wall 56 is narrow enough so that when the rear drawer wall 56 abuts the vertical portion of rib 39, a narrow transverse slot 59 (see FIGURE 5) is provided between the rear wall 44 of top lid 31b and flange 56a. At the same time, the spacing of the drawer runners 50 between the lid runners 45 and the ribs 48 is such as to space the upper face of flange 56a somewhat below the rearwardmost transverse rib 48 and so provide an additional, narrow, transverse slot 60 therebetween. The two slots 59 and 60 thus afford communication between inlet and outlet port 37 and 38 and the interior of drawer 54. In order to provide for discharge of the air from drawer 54, the shoulder 58a of the drawer front 58 is spaced sufficiently forward of the top lid end walls 47 and the forward transverse rib 48 so that small discharge openings 61 are left at each end of drawer front 58 (see FIGURE 6).

Figure 2:
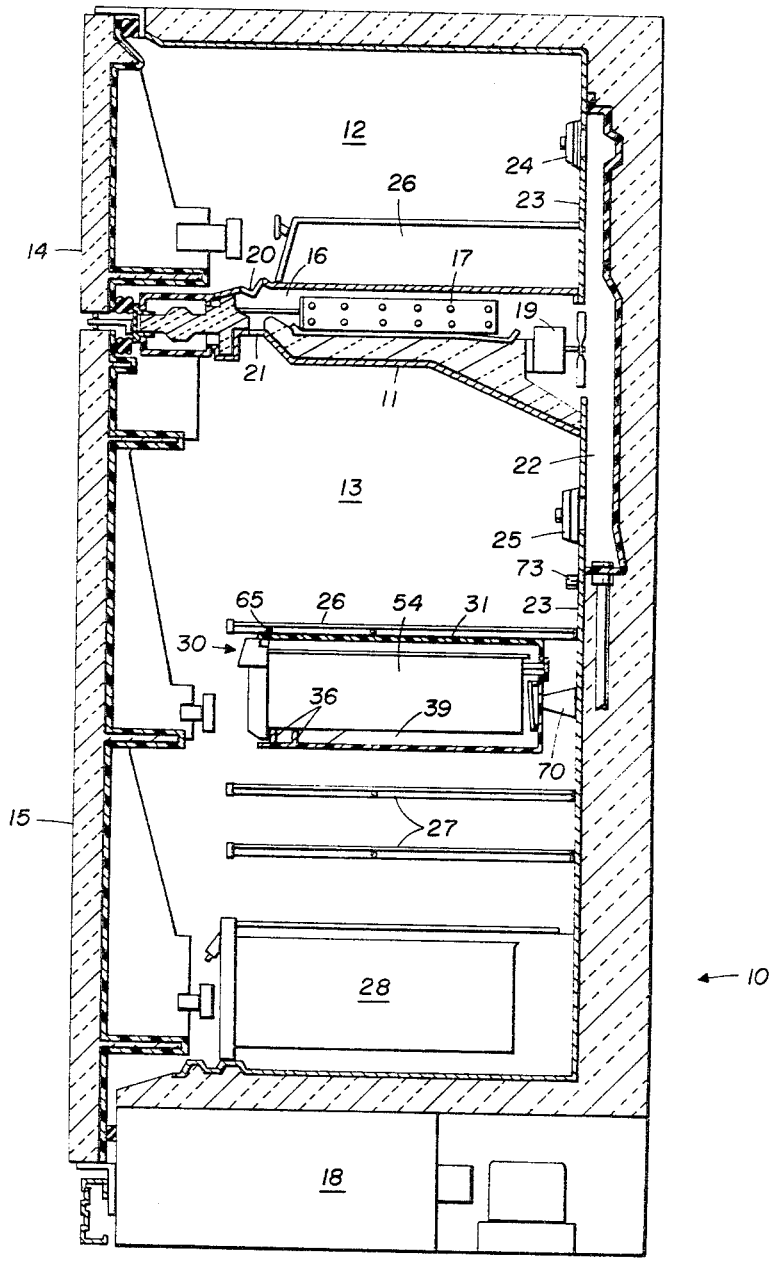
FIGURE 2 is a sectional view taken substantially along the line 2—2 of FIGURE 1.

The meat keeper unit 30 may be suspended, as shown in FIGURES 1 and 2, beneath one of the shelves 27 in the food compartment 13 in any convenient manner. That illustrated includes an inverted wire bracket 65 secured transversely across and beneath the front of one shelf 27, its ends fitting beneath the lower faces of the lid side walls 43. The upright portion at one end of bracket 65 is straddled by a releasable catch at the forward end of the right-hand lid side wall 43, the catch comprising a forward stop 66 and a latch 67 spaced rearward therefrom located on a depressible tongue 68 formed in the side wall 43 by a three-sided slot 69 constituting the forward and top and bottom margins of tongue 68. The rear of the meat keeper 30 is supported in turn by a short frusto-conical duct pipe 70 horizontally mounted at its rear end on the rear liner wall 23 and spigotted at its forward end in the inlet port 37. The duct pipe 70 in turn connects with a passageway 71 leading downwardly from plenum chamber 22 behind the rear liner wall 23. The amount of chilled air admitted to the rear end of duct pipe 70 is controlled by a vertically sliding gate valve 72 mounted on the back face of the rear liner wall 23 and operated by a small knob 73 extending through the liner wall 23. Any other suitable form of control for this purpose could obviously also be used.

The baffle 40 over the inlet port 37 directs the incoming chilled air upwardly, sidewardly and downwardly, more air being directed in the first two directions owing to the incline of the baffle 40. The air is thus passed over the adjacent side wall 55 and portion of the bottom wall 57 of drawer 54 as it moves forward. Next, it traverses the front portion of the drawer bottom wall 57 beyond the forward end of ribs 39 and then finally reverses rearwardly to the exit port 38 after bathing the remaining side wall 55 and portion of bottom wall 57 of drawer 54. From the exit port 38 the air simply spills into the rear of compartment 13. At the same time, a small amount of the air directed upwardly by the baffle 40 passes into and circulates within drawer 54 by virtue of the transverse slots 59 and 60, exiting into the front of the food compartment 13 from the openings 61. Preferably, the slots 59 and 60 and the openings 61 should be so designed that no more than 5% of the total air entering inlet port 37 finds its way into and through the drawer 54 proper. The inlet baffle 40 prevents localized sub-freezing temperatures on the rear wall 56 of drawer 54 as well as distributing the air in the desired directions. The reason two baffles 40 are employed is so that either port 37 or 38 may be used as the inlet, thus rendering the meat keeper 30 adaptable to other lateral locations within the compartment 13 as well as to the other forms of freezer-refrigerators. Depressing the tongue 68 will release the meat keeper 30 from the bracket 65 and permit it to be slid forward and removed as a unit from compartment 13 for further disassembly and cleaning. For the latter purpose the drawer 54 is first removed and then the top lid 31b is slid off the box 31a by working the catches 35 free of their slots 46.

Though the invention has been described in the form of a particular embodiment, being the best mode known of carrying out the invention, and detailed descriptive language has been used, it is not so limited. Instead, the following claims are to be read as encompassing all modifications and adaptations of the invention falling within the spirit and scope thereof.

We claim:

1. In refrigeration apparatus having a fresh food compartment, an air duct system having an inlet to and an outlet from said compartment, a refrigerant evaporator operating at below freezing temperatures disposed in said duct system, and air circulating means effective to circulate air through said duct system and compartment and over said evaporator, the improvement in combination therewith of a fresh meat storage unit, said storage unit comprising: a meat drawer having front, rear, side and bottom walls; an open front cooling sleeve for said drawer having rear, side, top and bottom walls and slidably receiving said meat drawer therein through said open front, the respective bottom, side and rear walls of said drawer and sleeve being in spaced relation to each other with the front wall of said drawer closing the front of said sleeve and the top wall of said sleeve closing the top of said drawer; an air inlet port in the rear wall of said sleeve communicating with said duct system downstream of said evaporator; an air outlet port in the rear wall of said sleeve communicating with the interior of said food compartment; partition means carried by said sleeve effective to define an air circulating passageway between the respective spaced walls of said drawer and sleeve, said passageway extending from said inlet port first forwardly adjacent the front of said drawer and sleeve and thence rearwardly to said outlet port; and valve means effective to regulate the flow of chilled air from said duct system through said air circulating passageway.

2. The combination of claim 1 wherein said inlet and outlet ports are laterally spaced from each other, and wherein said partition means includes a longitudinal upstanding rib on the rear and bottom walls of said sleeve, said rib extending first downwardly from the top wall of said sleeve between said ports and the respective rear walls of said drawer and sleeve and thence forwardly between the respective bottom walls of said drawer and sleeve, said rib terminating short of the front wall of said drawer and said ports communicating with the spacing between the rear walls of said drawer and sleeve on each side of said rib.

3. The combination of claim 2 wherein said storage unit includes supplemental air passages affording communication between said inlet port and said food compartment by way of the interior of said drawer, said supplemental air passages being effective to permit no more than approximately five percent of the air entering said inlet port to pass therefrom through said drawer.

4. The combination of claim 3 wherein said sleeve includes a removable lid portion having a top wall and depending side walls, said lid side walls including a first pair of runners slidably engaging a pair of flanges along the top edges of the side walls of said sleeve, said drawer having a pair of flanges along the top edges of its side walls slidably engaging a second pair of runners carried by said lid side walls and disposed above said first pair of runners and below said lid top wall effective to space the top edge of said drawer rear wall below said lid top wall.

5. The combination of claim 4 wherein said spacing between the top edge of said drawer rear wall and said lid top wall communicates with the spacing between the rear walls of said sleeve and drawer and provides a portion of said supplemental air passages, the remainder of said supplemental air passages being provided by openings adjacent the upper portion of the front wall of said drawer communicating with said food compartment.

6. The combination of claim 5 wherein said sleeve includes a baffle spaced intermediate said inlet port and the rear wall of said drawer and intermediate the top and bottom walls of said sleeve, one lateral end of said baffle abutting the adjacent side face of said rib and the other lateral end of said baffle being spaced from the adjacent side wall of said sleeve, said baffle being inclined with respect to the rear wall of said sleeve effective to provide a restricted downward egress between the bottom of said baffle and the rear wall of said sleeve for air from said port and a less restricted lateral egress between said other lateral end of said baffle and said rear wall for such air, the restriction of said lateral egress diminishing in an upward direction from the bottom of said baffle.

References Cited

UNITED STATES PATENTS

| 2,960,849 | 11/1960 | O'Cornell | 62—419 |
| 3,077,749 | 2/1963 | Jung | 62—382 |
| 3,164,970 | 1/1965 | Hubacker | 62—419 |
| 3,169,383 | 2/1965 | Morton | 62—382 |
| 3,241,334 | 3/1966 | Amore | 62—382 |
| 3,364,694 | 1/1968 | Cohen | 62—382 |

WILLIAM J. WYE, Primary Examiner

U.S. Cl. X.R.

62—382, 419